United States Patent
Sun et al.

(10) Patent No.: US 11,954,417 B1
(45) Date of Patent: Apr. 9, 2024

(54) METHOD FOR PREDICTING PERMEABILITY OF MULTI-MINERAL PHASE DIGITAL CORE BASED ON DEEP LEARNING

(71) Applicant: CHINA UNIVERSITY OF PETROLEUM (EAST CHINA), Qingdao (CN)

(72) Inventors: Hai Sun, Qingdao (CN); Liang Zhou, Qingdao (CN); Dongyan Fan, Qingdao (CN); Lei Zhang, Qingdao (CN); Jun Yao, Qingdao (CN); Yongfei Yang, Qingdao (CN); Kai Zhang, Qingdao (CN); Qian Sang, Qingdao (CN); Xia Yan, Qingdao (CN); Lei Liu, Qingdao (CN); Fei Luo, Qingdao (CN); Yuda Kan, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 0 days.

(21) Appl. No.: 18/504,557

(22) Filed: Nov. 8, 2023

(30) Foreign Application Priority Data

Nov. 9, 2022 (CN) .......................... 202211395425.8

(51) Int. Cl.
*G06F 30/28* (2020.01)
*G06F 30/27* (2020.01)
*G06F 113/08* (2020.01)

(52) U.S. Cl.
CPC .............. *G06F 30/28* (2020.01); *G06F 30/27* (2020.01); *G06F 2113/08* (2020.01)

(58) Field of Classification Search
CPC ....... G06F 30/28; G06F 30/27; G06F 2113/08
See application file for complete search history.

(56) References Cited

U.S. PATENT DOCUMENTS

2020/0279361 A1 9/2020 Koushavand et al.

FOREIGN PATENT DOCUMENTS

| CN | 113051841 A | 6/2021 |
| WO | 2022011894 A1 | 1/2022 |

OTHER PUBLICATIONS

Li Qiong, et al., "Reconstructing the 3D digital core with a fully convolutional neural network," Applied Geophysics, vol. 17, No. 3 (Sep. 2020), p. 401-410 (Year: 2020).*

(Continued)

*Primary Examiner* — Steven W Crabb
(74) *Attorney, Agent, or Firm* — Kolitch Romano Dascenzo Gates LLC

(57) ABSTRACT

Disclosed a method for predicting permeability of a multi-mineral phase digital core based on deep learning. In the present disclosure, a three-dimensional digital core is constructed and a pore structure is randomly generated; after a plurality of multi-mineral digital core images is acquired by performing image segmentation on the three-dimensional digital core, permeability corresponding to each of the multi-mineral digital core images is acquired by simulation using multi-physics field simulation software and a multi-mineral digital core data set is constructed based on the plurality of multi-mineral digital core images and the permeability corresponding to each of the multi-mineral digital core images; an SE-ResNet18 convolutional neural network is constructed and trained with the multi-mineral digital core data set; and an image of a multi-mineral core to be predicted is input into the trained SE-ResNet18 convolutional neural network to determine the permeability of the multi-mineral core.

8 Claims, 6 Drawing Sheets

(56) References Cited

OTHER PUBLICATIONS

Radmila Mandzhieva, "Introduction to digital core analysis: 3D reconstruction, numerical flow simulations and pore network modeling," Norwegian University of Science and Technology Department of Geoscience and Petroleum, Jun. 2017 (Year: 2017).*

Hany Gamal and Salaheldin Elkatatny, "Prediction Model Based on an Artificial Neural Network for Rock Porosity," Arabian Journal for Science and Engineering, 2017 (Year: 2017).*

China National Intellectual Property Administration, First Office Action in Patent Application No. CN202211395425.8 dated Mar. 30, 2023, which is a foreign counterpart application of this U.S. Patent Application, to which this application claims priority.

China National Intellectual Property Administration, Notification to grant patent right for invention of Chinese application No. 202211395425.8 dated Apr. 15, 2023, which is foreign counterpart application of this U.S. application.

Jing, Wenlong, et al., Method and application of homogeneous digital core permeability prediction based on TensorFlow, Journal of China University of Petroleum(Edition of Natural Science), 2021, 45(4), pp. 108-113, Aug. 31, 2021.

* cited by examiner

METHOD FOR PREDICTING PERMEABILITY OF MULTI-MINERAL PHASE DIGITAL CORE BASED ON DEEP LEARNING

CROSS-REFERENCE TO RELATED APPLICATION

This application claims priority to the Chinese Patent Application No. 202211395425.8, filed on Nov. 9, 2022 and entitled "METHOD FOR PREDICTING PERMEABILITY OF MULTI-MINERAL PHASE CORE BASED ON DEEP LEARNING," the entire content of which is incorporated herein by reference.

TECHNICAL FIELD

The present disclosure relates to the field of oil and gas field exploitation and development technologies, and in particular, relates to a method for predicting permeability of a multi-mineral phase digital core based on deep learning.

BACKGROUND

Shale oil is petroleum stored in shale formations (organic matter-rich, and predominantly nanoscale pore size) and is short for mature organic matter shale oil. Shale serves as both a hydrocarbon source rock and reservoir rock for oil. The shale oil exists in both adsorbed and free form and is generally lighter and lower in viscosity. Minerals in shale oil reservoirs generally include organic matters and minerals. Analysis of core samples collected from shale oil fields shows that the pore size of shale cores is small and ranges from nanoscale to micrometer scale, and properties of wall minerals of nanoscale pores have a significant impact on shale oil flow. As different mineral walls have different wettability, a fluid has different adsorption degrees on the walls.

So far, shale oil permeability is mainly acquired through simulation methods, such as molecular dynamics simulation (MDS), pore network modeling (PNM), direct numerical simulation (DNS), and core analysis. Molecular dynamics simulation has a huge computational workload and a small simulation scale, and thus it is impossible to directly use MDS to simulate flow in porous media at the pore scale.

Pore network modeling is usually used to reconstruct complex pore spaces in porous media, but the use of simplified pores and throat spaces for simulation cannot ensure the accuracy of shale oil permeability. Although direct numerical simulation has higher solution precision, traditional numerical simulation on practical fluid dynamics problems requires solving partial differential equation (PDE) systems on a grid with specific model parameters. A solving process of nonlinear coupled partial differential equations typically requires the construction of large matrices, resulting in a large amount of calculation. Moreover, the simulation of the shale oil at the nano-micron scale is usually accompanied by an increase in grid division and time-consuming iterative solution processes, which require higher hardware requirements for computers.

Core analysis usually includes routine core analysis (RCA) and special core analysis (SCAL). The routine core analysis is usually used to determine core parameters (such as porosity, particle density, and permeability), samples for routine core analysis are usually collected three to four times per meter, and more frequent sampling may be required due to fine stratification characteristics and changes in lithological space. The special core analysis provides a detailed study on rock characteristics. However, the special core analysis is time-consuming and expensive, and core sample sets selected for special core analysis need to include a plurality of rock types and be highly representative. In reality, it is difficult to acquire these core sample sets and estimate the correlation between routine core analysis results and special core analysis results. In addition, experimental determination of core permeability is time-consuming and costly.

Convolutional neural networks (CNN), as a special type of deep neural network, are commonly used to analyze image data and can extract specific features from input images by using multiple filters. Therefore, it is urgent to combine convolutional neural networks with core analysis, use deep learning to reduce the calculation cost of shale permeability, and improve the calculation accuracy of shale permeability.

SUMMARY

The present disclosure aims to overcome defects of the related art and purposes a method for predicting permeability of a multi-mineral phase digital core based on deep learning, achieves accurate prediction of the permeability of the multi-mineral phase core, increases the calculation speed of permeability, and provides a basis for guiding oil field exploration and development.

The technical solutions provided by the present disclosure are as follows.

A method for predicting permeability of a multi-mineral phase digital core based on deep learning specifically includes:
  step 1, constructing a three-dimensional digital core and randomly generating a pore structure in the three-dimensional digital core, wherein the pore structure includes organic matter pores and inorganic matter pores, and for the three-dimensional digital core, the pore structure is filled with a fluid and a rest thereof is set as a skeleton;
  step 2, acquiring a plurality of multi-mineral digital core images by performing image segmentation on the constructed three-dimensional digital core;
  step 3, acquiring permeability corresponding to each of the multi-mineral digital core images by using multi-physics field simulation software, and constructing a multi-mineral digital core data set based on the plurality of multi-mineral digital core images and the permeability corresponding to each of the multi-mineral digital core images;
  step 4, constructing an SE-ResNet18 convolutional neural network, training the SE-ResNet18 convolutional neural network with the multi-mineral digital core data set, and calculating permeability corresponding to each of the multi-mineral digital core images; and
  step 5, inputting an image of a multi-mineral core to be predicted into the trained SE-ResNet18 convolutional neural network, and obtaining permeability corresponding to the multi-mineral core with the trained SE-ResNet18 convolutional neural network according to the image of the multi-mineral core to be predicted.

In some embodiments, step 3 specifically includes:
  step 3.1, setting a density and viscosity of a fluid in a multi-mineral digital core, setting a side of the multi-mineral digital core as a fluid inlet, setting another side of the multi-mineral digital core as a fluid outlet, setting inlet pressure and outlet pressure of the fluid, and setting a wall slip length of the organic matter pores and a wall slip length of the inorganic matter pores in the multi-mineral digital core;

step 3.2, for each of the multi-mineral digital core images, constructing a multi-mineral digital core based on each of the multi-mineral digital core images, acquiring a flow process of the fluid in each multi-mineral digital core by simulation using the multi-physics field simulation software, acquiring a flow field distribution of each multi-mineral digital core in a stable state, and calculating permeability of each multi-mineral digital core; and step 3.3, by taking the permeability corresponding to each of the multi-mineral digital core images as labels and the plurality of multi-mineral digital core images and the permeability corresponding to each of the multi-mineral digital core images as sample data, constructing the multi-mineral digital core data set and dividing the multi-mineral digital core data set into a training set, a test set, and a validation set.

In some embodiments, in step 3.1, the inlet pressure of the fluid is set to 1 Pa, and the outlet pressure of the fluid is set to 0 Pa.

In some embodiments, in step 3.1, the wall slip length of the organic matter pores in the multi-mineral digital core is set to 130 nm, and the wall slip length of the inorganic matter pores in the multi-mineral digital core is set to 0 nm.

In some embodiments, in step 3.2, a calculation formula for the permeability of the multi-mineral digital core is:

$$K = \frac{v\mu L}{\Delta P} \qquad (1)$$

wherein K is the permeability of the multi-mineral digital core; v is Darcy's velocity; μ is the viscosity of the fluid; L is a length of the multi-mineral digital core; and ΔP is a pressure difference between the inlet pressure and the outlet pressure.

In some embodiments, in step 3.3, a ratio of sample data in the training set, the validation set, and the test set is set to 8:1:1.

In some embodiments, step 4 specifically includes:

step 4.1, constructing the SE-ResNet18 convolutional neural network by combining an SE module with an ResNet18 network model, wherein the SE-ResNet18 convolutional neural network is constructed by embedding the SE module in a double-layer residual module of the ResNet18 network model, the ResNet18 network model consists of one convolutional layer, eight double-layer residual modules, and a fully connected layer, with each of the double-layer residual modules consisting of two 3×3 convolutional layers and a skip connection;

step 4.2, setting a learning rate, a loss function, a precision value, and a number of trainings of the SE-ResNet18 convolutional neural network;

step 4.3, training the SE-ResNet18 convolutional neural network with sample data in the training set and calculating permeability according to the multi-mineral digital core images: inputting the sample data in the training set into the SE-ResNet18 convolutional neural network, acquiring calculated values of permeability corresponding to each of the multi-mineral digital core images by calculation through the SE-ResNet18 convolutional neural network, and comparing the calculated values of the permeability corresponding to each of the multi-mineral digital core images with the labels of the multi-mineral digital core images to calculate a loss function value until a number of iterative calculations reaches a preset number of trainings, and proceeding to step 4.4;

step 4.4, in a case that the loss function value is always less than a preset precision value during training, determining the learning rate of the SE-ResNet18 convolutional neural network and proceeding to step 4.5; otherwise, performing hyper-parametric optimization on the learning rate of the SE-ResNet18 convolutional neural network, after resetting the learning rate of the SE-ResNet18 convolutional neural network, returning to step 4.3, and continuing to train the SE-ResNet18 convolutional neural network with the sample data in the training set;

step 4.5, validating a training effect of the SE-ResNet18 convolutional neural network with the validation set: inputting sample data in the validation set into the SE-ResNet18 convolutional neural network, acquiring calculated values of permeability corresponding to each of the multi-mineral digital core images in the validation set by calculation through the SE-ResNet18 convolutional neural network, and comparing the calculated values of the permeability corresponding to each of the multi-mineral digital core images with the labels of the multi-mineral digital core images in the validation set to calculate a loss function value until a number of iterative calculations reaches a preset number of trainings, and proceeding to step 4.6;

step 4.6. in a case that the loss function value is always less than the preset precision value during validation, ending training the SE-ResNet18 convolutional neural network and proceeding to step 4.7; otherwise, performing hyper-parametric optimization on the learning rate of the SE-ResNet18 convolutional neural network, after resetting the learning rate of the SE-ResNet18 convolutional neural network, returning to step 4.3, and continuing to train the SE-ResNet18 convolutional neural network with the sample data in the training set; and step 4.7, testing calculation accuracy of the SE-ResNet18 convolutional neural network with the test set: inputting sample data in the test set into the SE-ResNet18 convolutional neural network, acquiring calculated values of permeability corresponding to each of the multi-mineral digital core images in the test set by calculation through the SE-ResNet18 convolutional neural network, and comparing the calculated values of the permeability corresponding to each of the multi-mineral digital core images with the labels of the multi-mineral digital core images in the test set to determine an accuracy rate of the SE-ResNet18 convolutional neural network.

In some embodiments, in step 4, the loss function is set as:

$$MSE = \frac{1}{m}\sum_{i=1}^{m}(k_i' - k_i)^2 \qquad (2)$$

wherein MSE is the loss function of the SE-ResNet18 convolutional neural network; m is a total number of pieces of sample data; i is a number of sample data; $k_i$ is a label of an $i^{th}$ sample data; and $k_i'$ is a calculated permeability value of the $i^{th}$ sample data.

In some embodiments, in step 4.7, a calculation formula of the accuracy rate of the SE-ResNet18 convolutional neural network is:

$$R = \frac{1}{n}\sum_{j=1}^{n} \frac{|k'_j - k_j|}{k_j} \qquad (3)$$

wherein R is the accuracy rate of the trained SE-ResNet18 convolutional neural network; n is a total number of pieces of sample data in the test set; j is a number of sample data; $k_j$ is a label of a $j^{th}$ sample data in the test set; and $k'_j$ is a calculated permeability value of the $j^{th}$ sample data in the test set.

The present disclosure has the following beneficial effects.

In the present disclosure, the multi-mineral digital cores are constructed according to the multi-mineral digital core images, the permeability of the multi-mineral digital cores is acquired by simulation by the multi-physics field simulation, the multi-mineral digital core data set is constructed, the constructed SE-ResNet18 convolutional neural network is trained with the multi-mineral digital core data set, and the permeability of the core corresponding to the multi-mineral digital core images is acquired with the trained SE-ResNet18 convolutional neural network. By training the SE-ResNet18 convolutional neural network to deeply learn the permeability solution of digital cores, fast and accurate prediction of core permeability has been achieved, calculation resources are saved, a foundation is laid for oil and gas field exploration and development, and thus a broad application prospect is achieved.

DETAILED DESCRIPTION

Specific embodiments of the present disclosure will be further described below with reference to the accompanying drawings by taking coring data of a certain oil field as an example.

A method for predicting permeability of a multi-mineral phase digital core based on deep learning provided by the present disclosure specifically includes the following steps.

In step 1, a three-dimensional digital core is constructed and a pore structure is randomly generated in the digital core, wherein the pore structure includes organic matter pores and inorganic matter pores; and for the digital core, the pore structure is filled with a fluid and the rest thereof is set as a skeleton.

Figure 1:
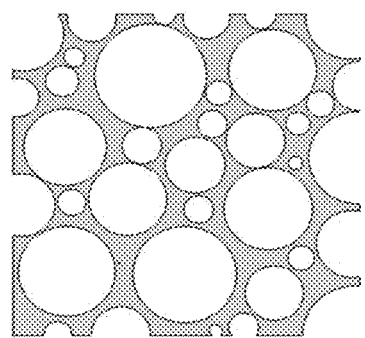
FIG. 1 is a schematic diagram of a three-dimensional digital core profile according to some embodiments of the present disclosure.

In this embodiment, the three-dimensional digital core is constructed by using MATLAB, and the three-dimensional digital core is initially set to be a cube structure of 1 m×1 m×1 m. The pore structure is randomly generated in the three-dimensional digital core and has an average value of 0.10 m to 0.15 m, a variance being controlled between 0.02 and 0.03, and a surface area being controlled to 0.7 to 0.8. The pore structure includes organic matter pores and inorganic matter pores. For the digital core, the pore structure is filled with fluid, and the rest of the pore structure is set as a skeleton. A core profile as shown in FIG. 1 is acquired by cutting the three-dimensional digital core, and in this embodiment, a total of 700 mph files are generated after the three-dimensional digital core is segmented.

In step 2, a plurality of multi-mineral digital core images is acquired by performing image segmentation on the constructed digital core.

Figure 2:
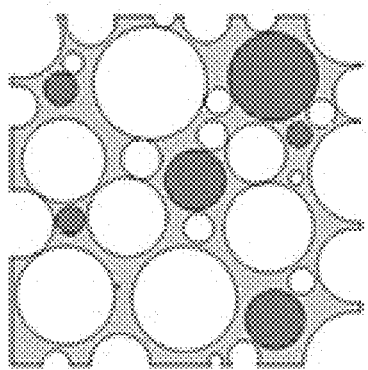
FIG. 2 is a diagram of a multi-mineral digital core according to some embodiments of the present disclosure.

In this embodiment, the size of the multi-mineral digital core image is first modified to 128×128×3; organic matters, inorganic matters, and pores on the multi-mineral digital core image are labeled with Image J software; the geometry of the multi-mineral digital core is then scaled with a scaling factor being set to 100, the geometric unit of the multi-mineral digital core is changed to a nanometer level, and thus the multi-mineral digital core with a side length of 100 nm is acquired. In this case, the average value of the pore structure in the multi-mineral digital core is 10 nm to 15 nm. The plurality of multi-mineral digital core images is acquired by performing image segmentation on the multi-mineral digital core, as shown in FIG. 2.

In step 3, permeability corresponding to each of the multi-mineral digital core images is acquired by using multi-physics field simulation software COMSOL, and a multi-mineral digital core data set is constructed based on the plurality of multi-mineral digital core images and the permeability corresponding to each of the multi-mineral digital core images. Step 3 specifically includes the following steps.

In step 3.1, a density and viscosity of a fluid in a multi-mineral digital core are set, a side of the multi-mineral digital core is set as a fluid inlet, another side of the multi-mineral digital core is set as a fluid outlet, inlet pressure and outlet pressure of the fluid are set, and a wall slip length of the organic matter pores and a wall slip length of the inorganic matter pores in the multi-mineral digital core are set. In this embodiment, the wall slip length of the organic matter pores and the wall slip length of the inorganic matter pores in the multi-mineral digital core are set to 130 nm and 0 nm respectively. It should be noted that the multi-mineral digital core refers to the multi-mineral digital core image.

Figure 3:
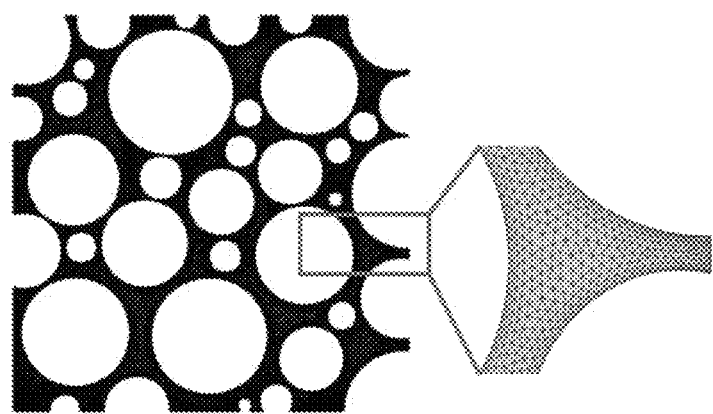
FIG. 3 is a schematic diagram of a permeability calculation grid using COMSOL to simulate a fluid flow process according to some embodiments of the present disclosure.

In this embodiment, the density and viscosity of the fluid in the multi-mineral digital core are set to 850 kg/m³ and 0.015 Pa·s respectively; a flow field is set to a laminar flow physical field; a side of the multi-mineral digital core is set as the fluid inlet and another side of the multi-mineral digital core is set as the fluid outlet; the inlet pressure and the outlet pressure of the fluid are set to 1 Pa and 0 Pa respectively; and the wall slip length of the organic matter pores and the wall slip length of the inorganic matter pores are set to 130 nm and 0 nm respectively. The multi-mineral digital core is gridded, and the number of acquired grids is 35477, as shown in FIG. 3.

Figure 4:
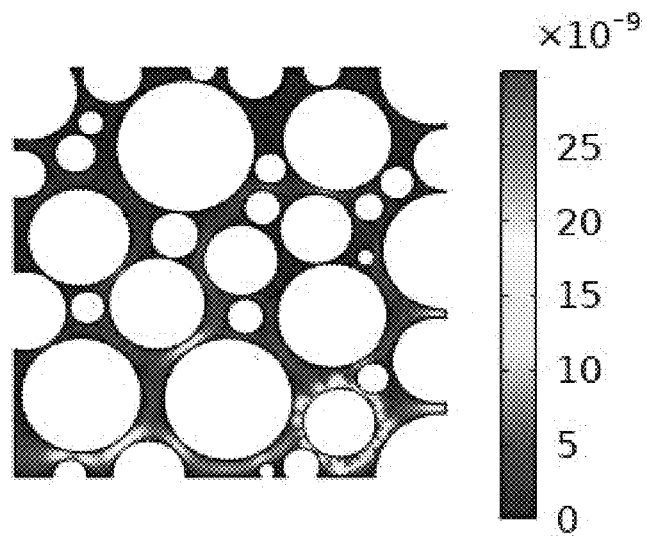
FIG. 4 is a diagram of flow field distribution in a multi-mineral digital core in a stable state according to some embodiments of the present disclosure.

In step 3.2, each of more than 700 multi-mineral digital core images in this embodiment (i.e., mph files in this embodiment) is simulated, a multi-mineral digital core is constructed based on each of the multi-mineral digital core images, a flow process of the fluid in each multi-mineral digital core is acquired by simulation using the multi-physics field simulation software, and a flow field distribution of each multi-mineral digital core in a stable state is acquired as shown in FIG. 4, the flow velocities of the fluid at different positions in the multi-mineral digital core can be acquired from FIG. 4, and the permeability of each multi-mineral digital cores is calculated. That is, the permeability corresponding to each of the multi-mineral digital core images is acquired.

A calculation formula for the permeability of the multi-mineral digital core is:

$$K = \frac{v\mu L}{\Delta P} \quad (1)$$

wherein K is the permeability of the multi-mineral digital core; v is Darcy's velocity; μ is the viscosity of the fluid; L is the length of the multi-mineral digital core; and ΔP is a pressure difference between the inlet pressure and the outlet pressure.

In step 3.3, by taking the permeability corresponding to each of the multi-mineral digital core images as labels and the plurality of multi-mineral digital core images and the permeability corresponding to each of the multi-mineral digital core images as sample data, the multi-mineral digital core data set is constructed, wherein the multi-mineral digital core data set includes a total of 700 pieces of sample data in this embodiment; and the sample data in the multi-mineral digital core data set is divided into a training set, a test set and a validation set according to the ratio of 8:1:1. The training set includes 560 pieces of sample data, the test set includes 70 pieces of sample data, and the validation set includes 70 pieces of sample data.

In step 4, an SE-ResNet18 convolutional neural network is constructed, the SE-ResNet18 convolutional neural network is trained with the multi-mineral digital core data set, and permeability corresponding to each of the multi-mineral digital core images is calculated. Step 4 specifically includes the following steps.

Figure 5:
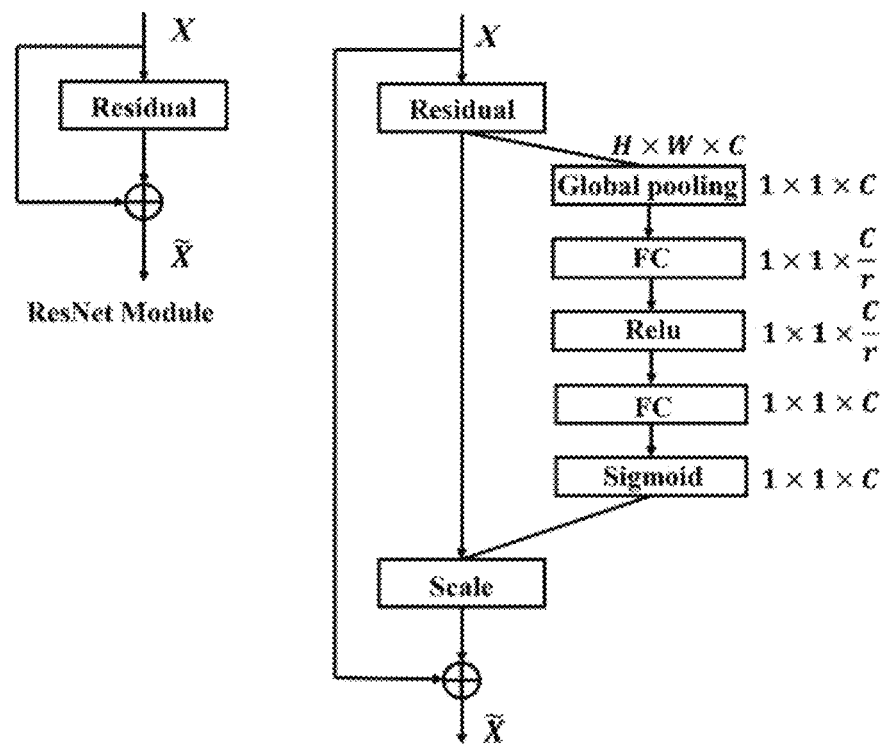
FIG. 5 is a structural schematic diagram of an SE-ResNet18 convolutional neural network according to some embodiments of the present disclosure.
Figure 6:
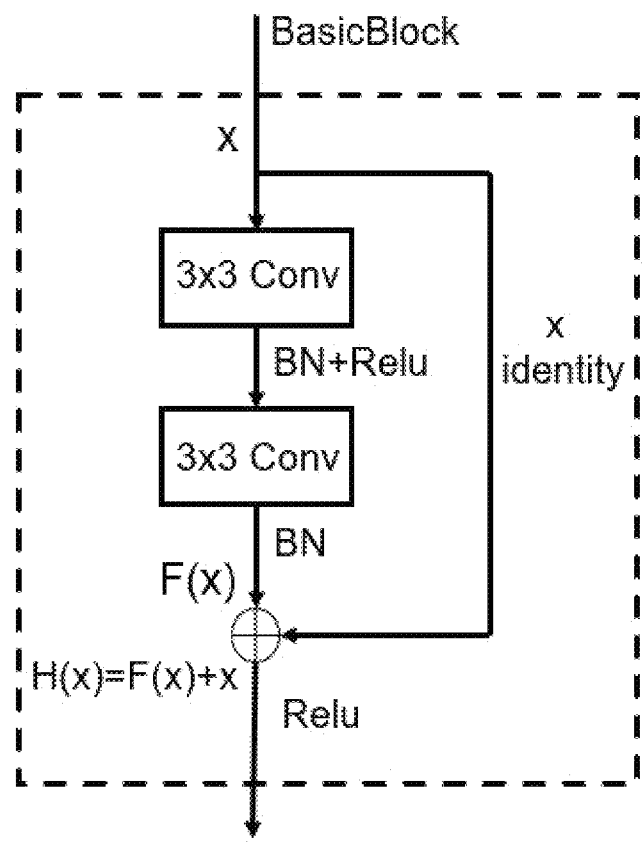
FIG. 6 is a structural schematic diagram of a double-layer residual module according to some embodiments of the present disclosure.
Figure 7:
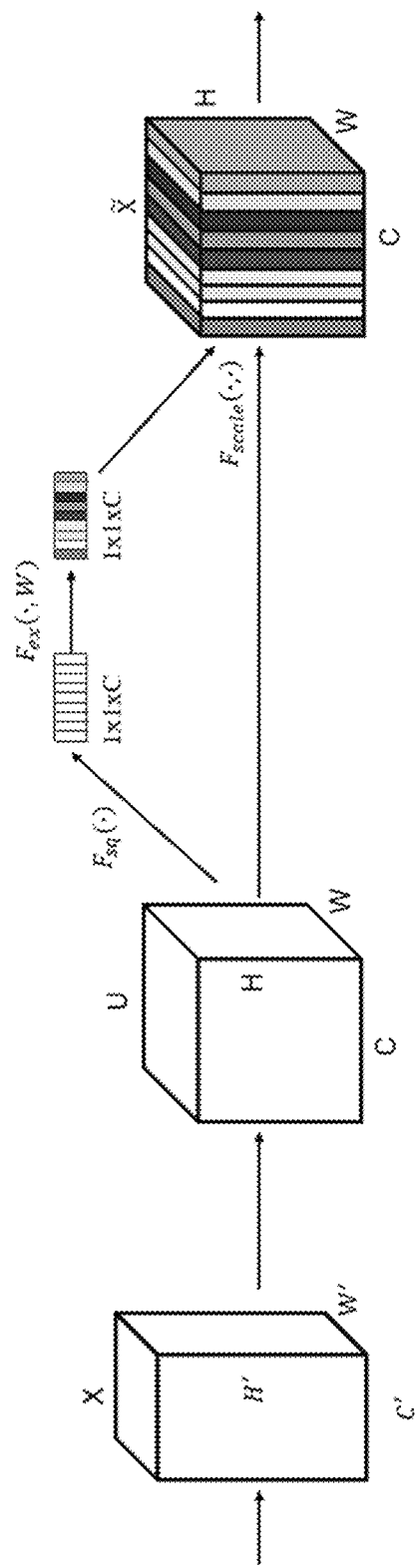
FIG. 7 is a structural schematic diagram of an SE module according to some embodiments of the present disclosure.

In step 4.1, the SE-ResNet18 convolutional neural network is constructed by combining an SE module with an ResNet18 network model. The SE-ResNet18 convolutional neural network is as shown in FIG. 5 and constructed by embedding the SE module in a double-layer residual module of the ResNet18 network model. As shown in FIG. 6, the ResNet18 network model consists of one convolutional layer, eight double-layer residual modules, and a fully connected layer, with each of the double-layer residual modules consisting of two 3×3 convolutional layers and a skip connection. As a channel attention mechanism, the SE module, as shown in FIG. 7, includes three steps of compression, excitation, and fusion, and emphasizes information about useful channels and suppresses information about part of channels by giving different weights to different channels.

In this embodiment, the SE-ResNet18 convolutional neural network is constructed by embedding the SE module in the double-layer residual module of the ResNet18 network model. This combines the characteristics of the SE module with the attention mechanism and the ResNet18 network model, avoids gradient vanishing and explosion during training, is conducive to fitting the correlation between network channels, reduces the amount of calculations, reduces the size of the calculation model, and increases the calculation speed while ensuring the calculation accuracy rate.

In step 4.2, a learning rate, a loss function, a precision value, and the number of trainings of the SE-ResNet18 convolutional neural network are set. In this embodiment, the learning rate is set to 5×10⁻⁶, 1×10⁻⁵ and 2×10⁻⁵ in sequence, the number of trainings is set to 30, a seed value of a random number during training is set to 123, and the value of batch_size is set to 8. Adam in Pytorch is invoked as a network optimizer. In this embodiment, the precision value is set to 0.014, and the mean squared error (MSE) loss is set to the loss function of the SE-ResNet18 convolutional neural network, as shown in formula (2):

$$MSE = \frac{1}{m}\sum_{i=1}^{m}(k_i' - k_i)^2 \quad (2)$$

wherein MSE is the loss function of the SE-ResNet18 convolutional neural network; m is the total number of pieces of sample data; i is the number of sample data; $k_i$ is a the label of an $i^{th}$ sample data; and $k_i'$ is a calculated permeability value of the $i^{th}$ sample data.

In step 4.3, the SE-ResNet18 convolutional neural network is trained with sample data in the training set and the permeability is calculated according to the multi-mineral digital core images: the sample data in the training set is input into the SE-ResNet18 convolutional neural network, calculated values of the permeability corresponding to each of the multi-mineral digital core images are acquired by calculation through the SE-ResNet18 convolutional neural network, and the calculated values of the permeability corresponding to each of the multi-mineral digital core images are compared with the labels of the multi-mineral digital core images to calculate a loss function value until the number of iterative calculations reaches the preset number of trainings, and this process proceeds to step 4.4. The multi-mineral digital core images are used as an input to the SE-ResNet18 convolutional neural network, and the permeability corresponding to each of the multi-mineral digital core images is used as an output of the SE-ResNet18 convolutional neural network.

In step 4.4, in the case that the loss function value is always less than a preset precision value during training, the learning rate of the SE-ResNet18 convolutional neural network is determined, and this process proceeds to step 4.5; otherwise, hyper-parametric optimization is performed on the learning rate of the SE-ResNet18 convolutional neural network and after the learning rate of the SE-ResNet18 convolutional neural network is reset, this process returns to step 4.3, and the sample data in the training set is continued to be used to train the SE-ResNet18 convolutional neural network.

In step 4.5, a training effect of the SE-ResNet18 convolutional neural network is validated with the validation set: sample data in the validation set is input into the SE-ResNet18 convolutional neural network, calculated values of the permeability corresponding to each of the multi-mineral digital core images in the validation set are acquired by calculation through the SE-ResNet18 convolutional neural network, and the calculated values of the permeability corresponding to each of the multi-mineral digital core images are compared with the labels of the multi-mineral digital core images to calculate a loss function value until the number of iterative calculations reaches the preset number of trainings, and this process proceeds to step 4.6.

In step 4.6. in the case that the loss function value is always less than the preset precision value during validation, training of the SE-ResNet18 convolutional neural network is ended and this process proceeds to step 4.7; otherwise, hyper-parametric optimization is performed on the learning rate of the SE-ResNet18 convolutional neural network and after the learning rate of the SE-ResNet18 convolutional neural network is reset, this process returns to step 4.3, and the sample data in the training set is continued to be used to train the SE-ResNet18 convolutional neural network.

In step 4.7, calculation accuracy of the SE-ResNet18 convolutional neural network is tested with the test set: sample data in the test set is input into the SE-ResNet18 convolutional neural network, calculated values of permeability corresponding to each of the multi-mineral digital core images in the test set are acquired by calculation through the SE-ResNet18 convolutional neural network, and the calculated values of the permeability corresponding to each of the multi-mineral digital core images are compared with the labels of the various multi-mineral digital core images in the test set to determine the accuracy rate of the SE-ResNet18 convolutional neural network, as shown in formula (3):

$$R = \frac{1}{n}\sum_{j=1}^{n} \frac{|k'_j - k_j|}{k_j} \quad (3)$$

wherein R is the accuracy rate of the trained SE-ResNet18 convolutional neural network; n is the total number of pieces of sample data in the test set; j is the number of sample data; $k_j$ is a label of a $j^{th}$ sample data in the test set; and $k_j'$ is a calculated permeability value of the $j^{th}$ sample data in the test set.

In step 5, an image of a multi-mineral core to be predicted is input into the trained SE-ResNet18 convolutional neural network, and permeability corresponding to the multi-mineral core is obtained with the trained SE-ResNet18 convolutional neural network according to the image of the multi-mineral core to be predicted.

Figure 8:
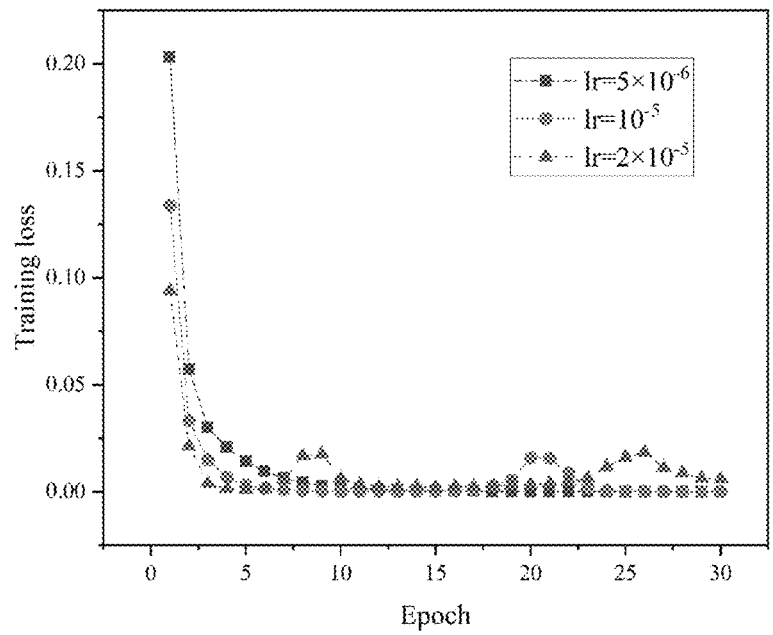
FIG. 8 is a diagram showing a relationship between a loss function value and the number of trainings according to some embodiments of the present disclosure.
Figure 9:
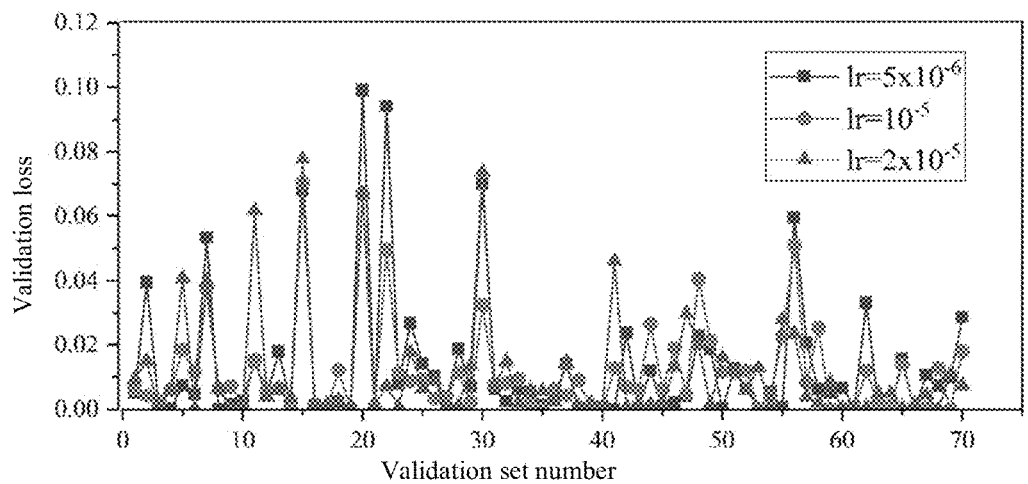
FIG. 9 shows loss values of various pieces of sample data in a validation set according to some embodiments of the present disclosure.

In this embodiment, the learning rate of the SE-ResNet18 convolutional neural network is set to $5\times10^{-6}$, $1\times10^{-5}$ and $2\times10^{-5}$ in sequence, the SE-ResNet18 convolutional neural network is trained with the multi-mineral digital core data set at each learning rate to calculate the permeability, and a relationship between the learning rate of the trained SE-ResNet18 convolutional neural network and the loss function is acquired by comparison, as shown in FIG. 8. It can be seen from FIG. 8 that after training for 30 times, a loss curve corresponding to the SE-ResNet18 convolutional neural network with the learning rate of $2\times10^{-5}$ rises significantly compared to loss curves corresponding to the SE-ResNet18 convolutional neural networks with the learning rates of $5\times10^{-6}$ and $1\times10^{-5}$ respectively. FIG. 9 shows loss function values of various pieces of sample data in the validation set when the SE-ResNet18 convolutional neural network is trained for the last time with the validation set. When the learning rate of the SE-ResNet18 convolutional neural network is $1\times10^{-5}$, an average loss value of the SE-ResNet18 convolutional neural network is 0.0116, which is obviously lower than the average loss value of 0.0133 when the learning rate is $5\times10^{-6}$, that is, it is preferable to set the learning rate of the SE-ResNet18 convolutional neural network to $1\times10^{-5}$.

Figure 10:
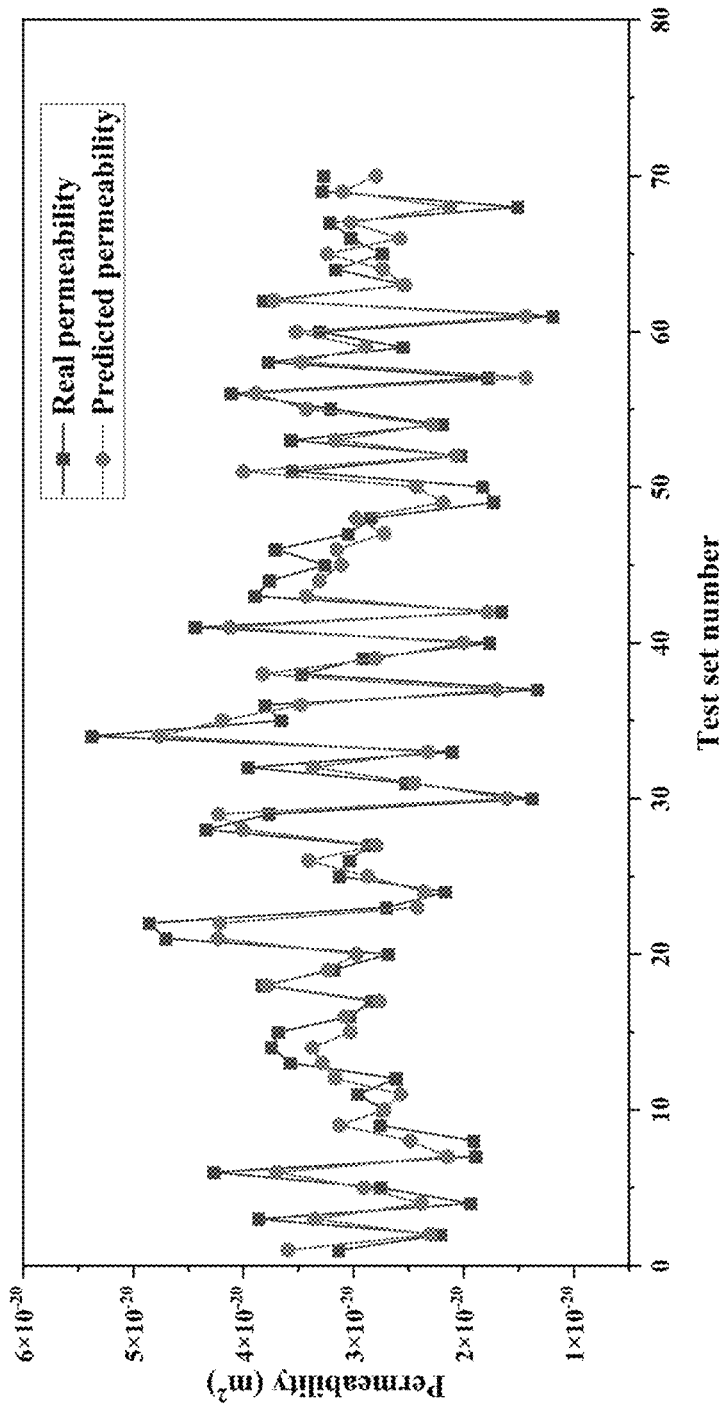
FIG. 10 is a comparison diagram of real permeability of rock and permeability of the rock predicted by the SE-ResNet18 convolutional neural network according to some embodiments of the present disclosure.

The learning rate of the SE-ResNet18 convolutional neural network is set to $1\times10^{-5}$, the calculation precision of the trained SE-ResNet18 convolutional neural network is validated with the sample data in the test data, and a comparison diagram of real permeability of rock and permeability of the rock predicted by the SE-ResNet18 convolutional neural network is drawn, as shown in FIG. 10. It can be seen from FIG. 10 that the accuracy rate of permeability prediction of the trained SE-ResNet18 convolutional neural network is 0.885. This means that the permeability of the multi-mineral rock can be predicted quickly and accurately according to the multi-mineral core image by using the method of the present disclosure.

In addition, the above descriptions are not intended to limit the present disclosure and the present disclosure is also not limited to the above examples. Changes, modifications, additions, or substitutions made by those skilled in the art within the essential scope of the present disclosure should also fall within the scope of protection of the present disclosure.

What is claimed is:

1. A method for predicting permeability of a multi-mineral phase digital core based on deep learning, specifically comprising:
    step 1, constructing a three-dimensional digital core and randomly generating a pore structure in the three-dimensional digital core, wherein the pore structure comprises organic matter pores and inorganic matter pores, and for the three-dimensional digital core, the pore structure is filled with a fluid and a rest thereof is set as a skeleton;
    step 2, acquiring a plurality of multi-mineral digital core images by performing image segmentation on the constructed three-dimensional digital core;
    step 3, acquiring permeability corresponding to each of the multi-mineral digital core images by using multi-physics field simulation software, and constructing a multi-mineral digital core data set based on the plurality of multi-mineral digital core images and the permeability corresponding to each of the multi-mineral digital core images;
    step 4, constructing an SE-ResNet18 convolutional neural network, training the SE-ResNet18 convolutional neural network with the multi-mineral digital core data set, and calculating permeability corresponding to each of the multi-mineral digital core images; and
    step 5, inputting an image of a multi-mineral core to be predicted into the trained SE-ResNet18 convolutional neural network, and obtaining permeability corresponding to the multi-mineral core with the trained SE-ResNet18 convolutional neural network according to the image of the multi-mineral core to be predicted, wherein step 3 specifically comprises:

step 3.1, setting a density and viscosity of a fluid in a multi-mineral digital core, setting a side of the multi-mineral digital core as a fluid inlet, setting another side of the multi-mineral digital core as a fluid outlet, setting inlet pressure and outlet pressure of the fluid, and setting a wall slip length of the organic matter pores and a wall slip length of the inorganic matter pores in the multi-mineral digital core;

step 3.2, for each of the multi-mineral digital core images, constructing a multi-mineral digital core based on each of the multi-mineral digital core images, acquiring a flow process of the fluid in each multi-mineral digital core by simulation using the multi-physics field simulation software, acquiring a flow field distribution of each multi-mineral digital core in a stable state, and calculating permeability of each multi-mineral digital core; and step 3.3, by taking the permeability corresponding to each of the multi-mineral digital core images as labels and the plurality of multi-mineral digital core images and the permeability corresponding to each of the multi-mineral digital core images as sample data, constructing the multi-mineral digital core data set and dividing the multi-mineral digital core data set into a training set, a test set, and a validation set.

2. The method for predicting the permeability of the multi-mineral phase digital core based on deep learning according to claim 1, wherein in step 3.1, the inlet pressure of the fluid is set to 1 Pa, and the outlet pressure of the fluid is set to 0 Pa.

3. The method for predicting the permeability of the multi-mineral phase digital core based on deep learning according to claim 1, wherein in step 3.1, the wall slip length of the organic matter pores in the multi-mineral digital core is set to 130 nm, and the wall slip length of the inorganic matter pores in the multi-mineral digital core is set to 0 nm.

4. The method for predicting the permeability of the multi-mineral phase digital core based on deep learning according to claim 1, wherein in step 3.2, a calculation formula for the permeability of the multi-mineral digital core is:

$$K = \frac{v\mu L}{\Delta P} \quad (1)$$

wherein K is the permeability of the multi-mineral digital core; v is Darcy's velocity; $\mu$ is the viscosity of the fluid; L is a length of the multi-mineral digital core; and $\Delta P$ is a pressure difference between the inlet pressure and the outlet pressure.

5. The method for predicting the permeability of the multi-mineral phase digital core based on deep learning according to claim 1, wherein in step 3.3, a ratio of sample data in the training set, the validation set, and the test set is set to 8:1:1.

6. The method for predicting the permeability of the multi-mineral phase digital core based on deep learning according to claim 1, wherein step 4 specifically comprises:

step 4.1, constructing the SE-ResNet18 convolutional neural network by combining an SE module with an ResNet18 network model, wherein the SE-ResNet18 convolutional neural network is constructed by embedding the SE module in a double-layer residual module of the ResNet18 network model, the ResNet18 network model consists of one convolutional layer, eight double-layer residual modules, and a fully connected layer, with each of the double-layer residual modules consisting of two 3×3 convolutional layers and a skip connection;

step 4.2, setting a learning rate, a loss function, a precision value, and a number of trainings of the SE-ResNet18 convolutional neural network;

step 4.3, training the SE-ResNet18 convolutional neural network with sample data in the training set and calculating permeability according to the multi-mineral digital core images: inputting the sample data in the training set into the SE-ResNet18 convolutional neural network, acquiring calculated values of permeability corresponding to each of the multi-mineral digital core images by calculation through the SE-ResNet18 convolutional neural network, and comparing the calculated values of the permeability corresponding to each of the multi-mineral digital core images with the labels of the multi-mineral digital core images to calculate a loss function value until a number of iterative calculations reaches a preset number of trainings, and proceeding to step 4.4;

step 4.4, in a case that the loss function value is always less than a preset precision value during training, determining the learning rate of the SE-ResNet18 convolutional neural network and proceeding to step 4.5; otherwise, performing hyper-parametric optimization on the learning rate of the SE-ResNet18 convolutional neural network, after resetting the learning rate of the SE-ResNet18 convolutional neural network, returning to step 4.3, and continuing to train the SE-ResNet18 convolutional neural network with the sample data in the training set;

step 4.5, validating a training effect of the SE-ResNet18 convolutional neural network with the validation set: inputting sample data in the validation set into the SE-ResNet18 convolutional neural network, acquiring calculated values of permeability corresponding to each of the multi-mineral digital core images in the validation set by calculation through the SE-ResNet18 convolutional neural network, and comparing the calculated values of the permeability corresponding to each of the multi-mineral digital core images with the labels of the multi-mineral digital core images in the validation set to calculate a loss function value until a number of iterative calculations reaches a preset number of trainings, and proceeding to step 4.6;

step 4.6, in a case that the loss function value is always less than the preset precision value during validation, ending training the SE-ResNet18 convolutional neural network and proceeding to step 4.7; otherwise, performing hyper-parametric optimization on the learning rate of the SE-ResNet18 convolutional neural network, after resetting the learning rate of the SE-ResNet18 convolutional neural network, returning to step 4.3, and continuing to train the SE-ResNet18 convolutional neural network with the sample data in the training set; and step 4.7, testing calculation accuracy of the SE-ResNet18 convolutional neural network with the test set: inputting sample data in the test set into the SE-ResNet18 convolutional neural network, acquiring calculated value of permeability corresponding to each of the multi-mineral digital core images in the test set by calculation through the SE-ResNet18 convolutional neural network, and comparing the calculated values of the permeability corresponding to each of the multi-mineral digital core images with the labels of the multi-mineral digital core images in the test set to determine an accuracy rate of the SE-ResNet18 convolutional neural network.

7. The method for predicting the permeability of the multi-mineral phase digital core based on deep learning according to claim 6, wherein in step 4, the loss function is set as:

$$MSE = \frac{1}{m}\sum_{i=1}^{m}(k'_i - k_i)^2 \qquad (2)$$

wherein MSE is the loss function of the SE-ResNet18 convolutional neural network; m is a total number of pieces of sample data; i is a number of sample data; $k_i$ is a label of an $i^{th}$ sample data; and $k_i'$ is a calculated permeability value of the $i^{th}$ sample data.

8. The method for predicting the permeability of the multi-mineral phase digital core based on deep learning according to claim 6, wherein in step 4.7, a calculation formula of the accuracy rate of the SE-ResNet18 convolutional neural network is:

$$R = \frac{1}{n}\sum_{j=1}^{n}\frac{|k'_j - k_j|}{k_j} \qquad (3)$$

wherein R is the accuracy rate of the trained SE-ResNet18 convolutional neural network; n is a total number of pieces of sample data in the test set; j is a number of sample data; $k_j$ is a label of a $j^{th}$ sample data in the test set; and $k_j'$ is a calculated permeability value of the $j^{th}$ sample data in the test set.

* * * * *